United States Patent
Leufen et al.

(10) Patent No.: US 9,366,220 B2
(45) Date of Patent: Jun. 14, 2016

(54) METHOD FOR OPERATING AN INTERNAL COMBUSTION ENGINE OF A HAND-GUIDED POWER TOOL

(71) Applicant: Andreas Stihl AG & Co. KG, Waiblingen (DE)

(72) Inventors: Heinrich Leufen, Schwaikheim (DE); Georg Maier, Kernen (DE); Jürgen Redecker, Kernen (DE); Alexander Klein, Waiblingen (DE); Erik Andresen, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 273 days.

(21) Appl. No.: 14/107,419

(22) Filed: Dec. 16, 2013

(65) Prior Publication Data
US 2014/0165964 A1    Jun. 19, 2014

(30) Foreign Application Priority Data
Dec. 19, 2012    (DE) .......................... 10 2012 024 840

(51) Int. Cl.
*F02P 5/04* (2006.01)
*F02P 5/15* (2006.01)
*F02P 15/00* (2006.01)

(52) U.S. Cl.
CPC ............... *F02P 5/045* (2013.01); *F02P 5/1502* (2013.01); *F02D 2400/06* (2013.01); *F02P 5/1504* (2013.01); *F02P 15/001* (2013.01); *Y02T 10/46* (2013.01)

(58) Field of Classification Search
CPC ..... F02D 37/02; F02D 2200/101; F02N 3/02; F02N 2300/12; F02P 5/04; F02P 5/045; F02P 5/1504; F02P 5/1506; F02P 5/1508; Y02T 10/46

USPC ............ 123/179.5, 339.11, 406.12, 406.19, 123/406.23–406.25, 406.32, 406.35, 123/406.36; 701/105, 110
See application file for complete search history.

(56) References Cited

U.S. PATENT DOCUMENTS

| | | | |
|---|---|---|---|
| 4,495,918 A * | 1/1985 | Sugiura ................. | F02P 5/1526 123/406.16 |
| 7,556,020 B2 | 7/2009 | Kolossow | |
| 7,822,536 B2 * | 10/2010 | Sata ..................... | F02D 41/0025 123/179.5 |
| 2009/0012699 A1 * | 1/2009 | Bahner ............... | F02D 41/2422 701/105 |
| 2010/0012084 A1 * | 1/2010 | Andersson ............ | F02P 5/1504 123/350 |
| 2010/0145595 A1 * | 6/2010 | Bellistri ............... | F02M 55/007 701/103 |

* cited by examiner

*Primary Examiner* — John Kwon
*Assistant Examiner* — Johnny H Hoang
(74) *Attorney, Agent, or Firm* — Gudrun E. Huckett

(57) ABSTRACT

In a power tool, an internal combustion engine is coupled by a clutch to a tool member. An ignition control device is provided that for each engine speed of the internal combustion engine specifies at least one ignition timing. For each engine speed of a first engine speed range a correlated first ignition timing is specified, wherein each first ignition timing is an ignition timing of a first ignition timing range. For each engine speed of a second engine speed range, adjoining the first engine speed range, a correlated second ignition timing is specified, wherein each second ignition timing is an ignition timing of a second ignition timing range. The first ignition timing is retarded by at least 5° crank angle relative to the second ignition timing. The first engine speed range extends at least from the coupling engine speed range to the limit engine speed of approximately 7,000 RPM.

19 Claims, 3 Drawing Sheets

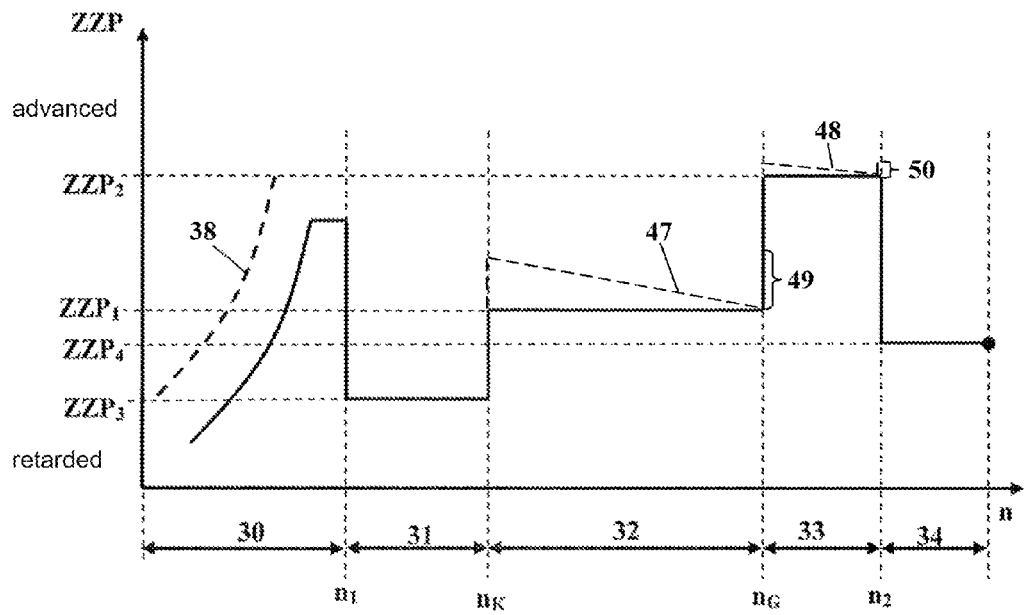
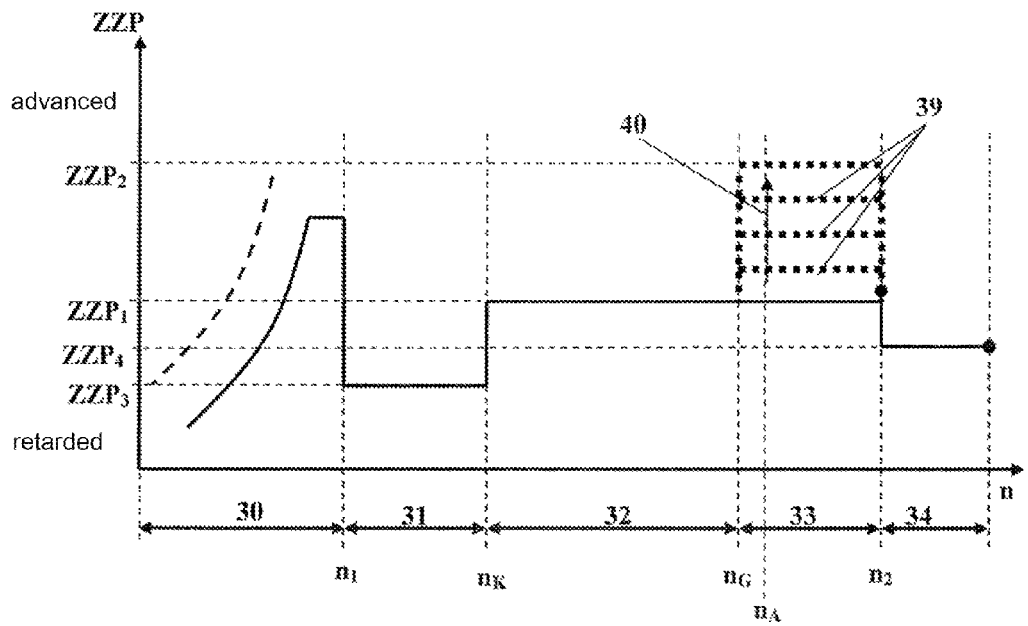

METHOD FOR OPERATING AN INTERNAL COMBUSTION ENGINE OF A HAND-GUIDED POWER TOOL

BACKGROUND OF THE INVENTION

The invention relates to a method for operating an internal combustion engine of a hand-guided power tool, for example, a trimmer, a blower, a motor chainsaw, a cut-off machine or the like. The power tool has a clutch and at least one tool member wherein the clutch engages at a coupling engine speed so that the internal combustion engine at engine speeds above the coupling engine speed is operatively connected with the tool member, wherein the internal combustion engine comprises a cylinder in which a piston is reciprocatingly supported and drives a crankshaft that is rotatably supported in the crankcase, wherein the internal combustion engine has an ignition control device that, for each engine speed of the internal combustion engine, specifies at least one ignition timing, wherein the ignition control unit for each engine speed of a first engine speed range specifies a correlated first ignition timing and for each engine speed of a second engine speed range adjoining the first engine speed range specifies a correlated second ignition timing, wherein each first ignition timing is an ignition timing of a first ignition timing range and each second ignition timing is an ignition timing of a second ignition timing range, and wherein each first ignition timing is retarded by at least 5° crank angle relative to each second ignition timing.

U.S. Pat. No. 7,556,020 discloses a method for operating an internal combustion engine of a hand-held power tool wherein the ignition timing is determined based on the engine speed. At idle, ignition timing is retarded. In an acceleration range which adjoins the idle speed range, an advanced ignition timing is adjusted which is advanced further as engine speed increases, except for ignition timing associated with full load operation.

It has been found that in an internal combustion engine which is controlled in this fashion no stable operation in the partial load range is possible. The engine speed fluctuates greatly so that it is impossible for the operator to maintain a constant engine speed. Partial load operation with reduced engine speed relative to full load operation is desirable for specific applications of a hand-held power tool, for example, cutting grass or rice plants. With reduced engine speed, a gentler cut is achieved and subsequent damage to the plants as a result of the cut can be reduced. At the same time, noise emissions are reduced as a result of the reduced engine speed. When operating in partial load range, gyroscopic forces which are caused by rotating masses are lower than at full load so that an improved operating comfort is provided in partial load operation. Moreover, the fuel consumption is reduced compared to full load operation. The rotating masses are in particular the rotating masses of the engine and of the tool member. An internal combustion engine that enables stable operation at partial load is therefore desirable.

SUMMARY OF THE INVENTION

It is an object of the present invention to provide a method for operating an internal combustion engine of a hand-guided power tool with which, even at partial load, a stable operation with minimal engine speed fluctuations is possible.

In accordance with the present invention, this is achieved in that the first engine speed range extends at least from the coupling engine speed up to a limit engine speed which is at least approximately 7,000 RPM.

It has been found that for a stable partial load operation the ignition timing in a first engine speed range, which corresponds to the partial load range, should be retarded by at least 5° crank angle relative to the ignition timing in a second engine speed range which corresponds to the full load range. The first engine speed range extends at least from the coupling engine speed to a limit engine speed of approximately 7,000 RPM. Beginning at the coupling engine speed and up to an engine speed (i.e., rotational speed of the engine) of approximately 7,000 RPM, a comparatively late (retarded) ignition timing is selected according to the invention. In particular in case of an already hot internal combustion engine, the retarded ignition timing artificially worsens the performance of the internal combustion engine in the partial load range. As a result of the retarded ignition timing in the first engine speed range, less energy is produced for each combustion cycle. In order to maintain the engine speed constant, it is known to skip or suspend ignition within individual engine cycles. When in the first engine speed range ignition is carried out at a comparatively early (advanced) ignition timing, the crankshaft is accelerated very strongly and ignition must be suspended for several engine cycles until the engine speed has again dropped to the desired value. Due to the strong acceleration of the crankshaft after ignition and the subsequently occurring several engine cycles without combustion, strong fluctuations of the engine speed are observed. When in the first engine speed range ignition occurs retarded, acceleration of the crankshaft is reduced and it is therefore only necessary to suspend ignition for a few engine cycles, in particular for none of the subsequent engine cycles. Accordingly, the engine speed in the partial load range can be kept constant in approximation. A permanent operation in a wide partial load range is possible. The operator can keep the engine speed stable and can operate the power tool permanently in partial load range, for example, when only a reduced power for operating the tool member is required.

The limit engine speed corresponds advantageously at least to twice the coupling engine speed. In this way, a very broad partial load range is provided that extends across a comparatively wide engine speed range. The limit engine speed range is advantageously approximately 7,000 RPM up to approximately 9,000 RPM.

Advantageously, the first ignition timing and the second ignition timing differ from each other by at least 10° crank angle. The first ignition timing is retarded by at least 10° crank angle relative to the second ignition timing. Between the first engine speed range and the second engine speed range, there is therefore a distinct ignition timing jump of at least 10° crank angle.

Advantageously, each ignition timing range encompasses at most 8° crank angle. The ignition timing ranges each correspond therefore to an ignition timing band with a width of 8° crank angle. The two ignition timing bands have a spacing of at least 5° crank angle relative to each other. Advantageously, the relation between the ignition timing and engine speed in at least one of the ignition timing ranges is linear. In this context, the ignition timing can change linearly as a function of the engine speed or can be constant for the entire engine speed range. In particular, the ignition timing for increasing engine speed is not adjusted to "advanced" within the ignition timing range. The ignition timing can be constant for increasing engine speed or can be adjusted to "retarded". By retarding the ignition timing in at least one partial section of the first engine speed range, the engine speed is stabilized because the combustion, as a result of the adjustment of the ignition timing to "retarded" for increasing engine speed, releases less energy and therefore causes an engine speed drop. The curve that represents the relation between ignition timing and engine speed is advantageously continuous within the first engine speed range. The curve that indicates the relation between ignition timing and engine speed has no jump for the first engine speed range. The curve can extend linearly in partial sections or across the entire first engine speed range. Advantageously, the curve is comprised of several straight lines having different slopes.

The first ignition timing is advantageously in the range of approximately 10° crank angle before top dead center of the piston up to approximately 40° crank angle before top dead center of the piston. It is particularly advantageous when the first ignition timing is in the range of approximately 10° crank angle before top dead center of the piston up to approximately 35° crank angle before top dead center of the piston.

The second ignition timing is advantageously in the range of approximately 20° crank angle before top dead center of the piston up to 45° crank angle before top dead center of the piston, in particular approximately 30° crank angle before top dead center of the piston up to approximately 40° crank angle before top dead center of the piston. In this way, a high power output upon operation of the internal combustion engine in the second engine speed range that corresponds to full load range is achieved.

Each engine speed of the first engine speed range has correlated therewith a first ignition timing and each engine speed of the second engine speed range has correlated therewith a second ignition timing. Advantageously, in at least one operating state, when an engine speed change from an engine speed outside of one of the engine speed ranges to an engine speed of one of the engine speed ranges occurs, i.e., for an engine speed change from an engine speed outside of the first engine speed range to an engine speed within the first engine speed range or for an engine speed change from an engine speed outside of the second engine speed range to an engine speed within the second engine speed range, the ignition timing is not adjusted suddenly to an ignition timing correlated with this first or second engine speed range but is controlled time-dependently until the correlated ignition timing has been reached or the engine speed leaves this first or second engine speed range again. It has been found that for an engine speed change to an engine speed of one of the first and second engine speed ranges, a sudden adjustment (jump) of the ignition timing to the ignition timing that is correlated with this engine speed range can be disadvantageous. It is therefore provided that within the first and the second engine speed ranges, when the engine speed enters this engine speed range, the ignition timing is not adjusted initially to the ignition timing that is specified by the ignition control device for this engine speed range but controlled time-dependently for adjustment to the ignition timing correlated with the engine speed range. The time-dependent control can be a stepwise linear control or any curve-based control.

A sudden adjustment of the ignition timing, in particular for an adjustment of the ignition timing from a first ignition timing to a second ignition timing, i.e., with a significant sudden adjustment of the ignition timing to "advanced", may cause undesirable vibrations of the power tool. The sudden adjustment of the ignition timing to "advanced" has the effect of a sudden power increase which is transmitted onto the drive shaft of a tool member of the power tool. The power increase causes a jerk on the tool member and this causes in turn the engine speed in a subsequent engine cycle to drop again below the limit engine speed resulting in a retarded ignition timing. A subsequent acceleration then causes surpassing the limit engine speed and an adjustment jump of the ignition timing to "advanced". The engine speed therefore surpasses or drops below the limit engine speed several times in short intervals and this causes vibrations of the power tool. These vibrations can be avoided by a time-dependent control of the ignition timing upon surpassing the limit engine speed.

In particular in case of a cold internal combustion engine and upon acceleration into the partial load range, an ignition at the first ignition timing causes a bad acceleration behavior because the first ignition timing that is correlated with the partial load range effects in case of a cold engine a combustion duration that is too short and thus a bad cold acceleration. The acceleration upon change of the engine speed to an engine speed of the first engine speed range can be improved significantly in that the ignition timing is first adjusted to the second ignition timing, i.e., an advanced ignition timing, and the adjustment to the first ignition timing is then realized by time-dependent control.

A simple embodiment results when the time-dependent control of the ignition timing is realized as a function of several engine cycles. Advantageously, after surpassing the limit engine speed the ignition timing is adjusted, after completion of a predetermined number of engine cycles in this engine speed range, in a stepwise manner to the ignition timing that is correlated with this engine speed range. Accordingly, the adjustment of the ignition timing is not realized immediately after the engine speed has been changed to this engine speed range but only once a predetermined number of engine cycles in this engine speed range has been completed. Accordingly, for engine speed changes in the range of the limit engine speed, i.e. when the engine speed has dropped below or surpassed several times in short sequential intervals the limit engine speed, a stable running behavior is achieved. The adjustment of the ignition timing to the ignition timing that is correlated with this engine speed range can be realized also after a predetermined time in this engine speed range has elapsed or after surpassing an activation engine speed that is above the limit engine speed. Also, a combination of these criteria for beginning the adjustment of the ignition timing can be provided. It can also be provided that the adjustment of the ignition timing is realized immediately after change of the engine speed into this engine speed range.

Advantageously, the ignition timing upon engine speed change from an engine speed of the first engine speed range to an engine speed of the second engine speed range is adjusted time-dependently in at least one operating state, the first ignition timing being the starting point, to "advanced" until the second ignition timing is reached or the engine speed leaves the second engine speed range. The time-dependent adjustment of the ignition timing for an engine speed change from an engine speed of the first engine speed range to an engine speed of the second engine speed range is realized in particular in any operating state. An operating state can be operation above or below a predetermined operating temperature of the internal combustion engine, i.e., operation for a cold or a warm internal combustion engine. An operating state can also be dependent on the ambient pressure, the fuel composition, or the like. Also, a combination of these parameters or additional or other parameters can define an operating state. A first operating state differs from a second operating state in that different ignition timings for the same engine speed are expedient.

For an engine speed change from an engine speed outside of the first engine speed range to an engine speed within the first engine speed range, it is advantageously provided that, when at least one first predetermined criterion is fulfilled, the ignition timing, the second ignition timing being the starting point, is adjusted time-dependently to "retarded" until the first ignition timing is reached or the engine speed leaves the first engine speed range. The adjustment of the ignition timing from the second to the first ignition timing is in particular provided when the engine speed changes from an engine speed of the second engine speed range to an engine speed of the first engine speed range. The time-dependent adjustment of the ignition timing from the second ignition timing to the first ignition timing is however provided also when the engine speed upon acceleration passes from idle range into the first engine speed range. When the engine speed changes from the idle range to partial load range, it is also provided to adjust the ignition timing first to the ignition timing of the second engine speed range. This is usually a rather significant adjustment of the ignition timing to "advanced". In this way, an excellent acceleration of the internal combustion engine is achieved.

The first criterion that, when fulfilled, causes the ignition timing, the second ignition timing being the starting point, to be time-dependently adjusted to "retarded" until the first ignition timing is reached or the engine speed leaves the first engine speed range, is in particular the event of reaching a temperature of the power tool, in particular reaching a desired operating temperature. In particular when the engine is cold, the comparatively late (retarded) ignition timing that is provided in the first engine speed range leads to an unsatisfactory acceleration. For a cold engine, i.e., when the internal combustion engine is operated below the desired operating temperature, it is therefore provided to adjust the ignition timing in the first engine speed range first to the second ignition timing. When the predetermined first criterion is fulfilled, the ignition timing, starting from the second ignition timing, is adjusted stepwise to the first ignition timing, i.e., is "retarded", when the engine speed is within the first engine speed range.

The first predetermined criterion is advantageously the event of reaching a temperature of the power tool and/or completion of a predetermined number of engine cycles after a predetermined event. The predetermined event is in this context the start of the internal combustion engine. It is particularly advantageous to measure the temperature of the internal combustion engine or a temperature that allows to deduce the temperature of the internal combustion engine, for example, the temperature of an ignition control device or the like. The temperature of the internal combustion engine is measured in particular by a temperature sensor at the cylinder or the crankcase of the internal combustion engine. As a function of the measured temperature, it is advantageously determined how many engine cycles have to be completed until it can be assumed that the first predetermined criterion is fulfilled, in particular the desired operating temperature has been reached. After completion of this number of engine cycles, when the engine speed changes from an engine speed outside of the first engine speed range to an engine speed within the first engine speed range, an adjustment of the ignition timing immediately to the first ignition timing is provided.

For determining whether the predetermined first criterion is fulfilled, it can be provided also that the number of completed engine cycles after surpassing a predetermined engine speed is determined. Also, the engine cycles that must have been completed above the predetermined engine speed can be set based on a temperature measured before starting the internal combustion engine. However, it can also be provided that the predetermined first criterion is determined only based on a temperature of the power tool or only based on the number of completed engine cycles after a predetermined event, for example, the start of the internal combustion engine, or after surpassing a predetermined engine speed. The predetermined engine speed is in this context in particular the limit engine speed. By measuring a temperature of the internal combustion engine, in particular the temperature of the crankcase of the cylinder, it can also be measured directly whether the internal combustion engine has reached the operating temperature.

One embodiment of the invention will be explained in the following with the aid of the drawings.

BRIEF DESCRIPTION OF THE DRAWING

FIG. 4 is an illustration of the course of the ignition timing for the internal combustion engine as a function of the engine speed.

FIG. 5 is a an illustration of another course of the ignition timing for the internal combustion engine as a function of the engine speed.

DESCRIPTION OF THE PREFERRED EMBODIMENTS

Figure 1:
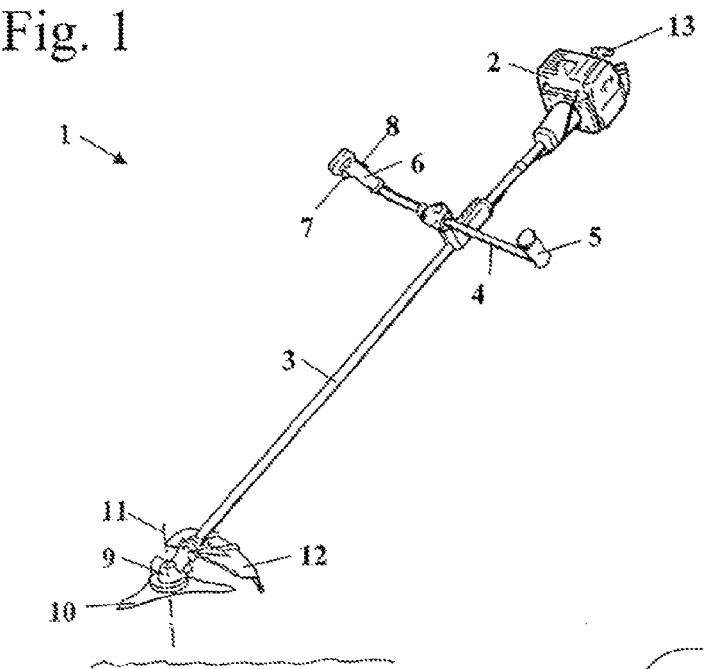
FIG. 1 is a schematic illustration of a hand-guided power tool.

FIG. 1 shows a trimmer as an example of a hand-guided power tool 1. The method disclosed in the following for operating an internal combustion engine can be performed however for any internal combustion engine in any other hand-guided power tool such as a blower, hedge trimmer, motor chainsaw, a cut-off machine or the like. In a blower, the fan wheel that conveys the working air stream is the tool member. The method disclosed in the following is advantageously used in the internal combustion engine of a hand-held power tool that is operated usually over an extended period of time at partial load. This is the case in particular for trimmers that have a metal knife as a tool.

Figure 2:
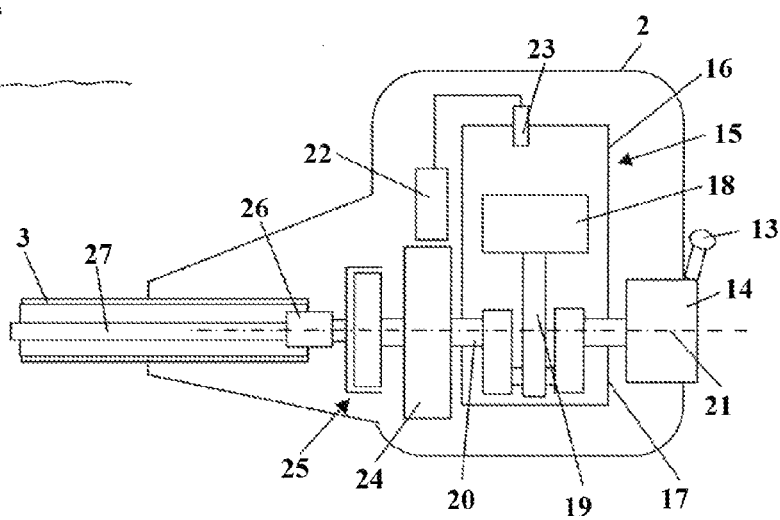
FIG. 2 is a schematic section illustration of the power tool of FIG. 1.

The power tool 1 has a motor housing 2 at one end of a guide tube 3; in the housing 2 the internal combustion engine 15 indicated in FIG. 2 is disposed.

A starter grip 13 projects from the motor housing 2 and serves for actuating a starter device 14 of the internal combustion engine 15.

As shown in FIG. 1, on the end of the guide tube 3 which is facing away from the motor housing 2 and is facing the ground, a gear head 9 is provided whose drive shaft, not illustrated, drives knife 10 in rotation about axis of rotation 11. Adjacent to the gear head 9, the guide tube 3 is provided with a guard 12. As shown in FIG. 1, on the guide tube 3 a grip frame 4 is supported that has two handles 5 and 6. The handle 6 supports a throttle trigger 7 for operating the internal combustion engine 15 as well as a throttle trigger lock 8.

Figure 3:
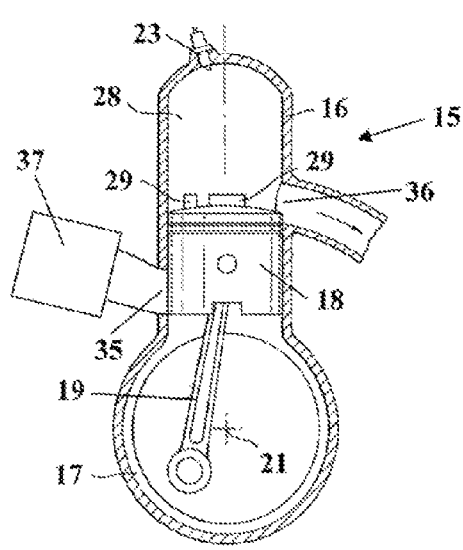
FIG. 3 is a schematic section illustration of the internal combustion engine of the power tool of FIG. 1.

As shown in FIG. 2, the internal combustion engine 15 has a cylinder 16 in which piston 18 is supported reciprocatingly. The piston 18 drives by means of connecting rod 19 a crankshaft 20 which is rotatably supported about axis of rotation 21 in the crankcase 17. As shown in FIG. 3, in the cylinder 16 a combustion chamber 28 that is delimited by piston 18 is provided. A spark plug 23 projects into the combustion chamber 28. As shown in FIG. 2, the spark plug 23 is controlled by an ignition control device 22. In the illustrated embodiment, the ignition control device 22 is arranged on the outer circumference of a flywheel 24. The flywheel 24 supports magnets, not illustrated, that generate in the ignition device 22 the ignition voltage for the spark plug 23. The ignition control device 22 can also be a separate control unit. The flywheel 24 is connected fixedly with the crankshaft 20. A clutch 25 designed as a centrifugal clutch is mounted on the crankshaft 20 on the side of the flywheel 24 facing away from the engine 15 and, when engaged, connects the crankshaft 20 with the drive shaft 27. The drive shaft 27 penetrates the guide tube 3 and drives the gearbox provided with in the gear head 9. The clutch drum of the coupling 25 is connected in the shown embodiment by means of a coupling element 26 with the drive shaft 27.

As shown in FIG. 3, the combustion engine 15 is designed as a two-stroke engine. The combustion engine 15 is a single-cylinder engine. The combustion engine 15 has an inlet 35 that opens into the crankcase 17 and is controlled by piston 18. By means of inlet 35 fuel/air mixture is supplied to the crankcase 17. The fuel/air mixture is formed in a carburetor 37 in which the sucked-in combustion air is supplied with fuel. It can also be provided that the fuel is fed by a fuel valve into the carburetor 37, into the intake passage or directly into the crankcase 17 or into the combustion chamber 28. At bottom dead center of the piston 18, the crankcase 17 is connected by transfer passages 29 with the combustion chamber 28. The ports of the transfer passages 29 opening into the combustion chamber 28 are also controlled by piston 18. An outlet 36 that is also controlled by piston 18 extends away from the combustion chamber 28. In operation, upon upward stroke of the piston 18, fuel/air mixture is sucked in via inlet 35 into the crankcase 17. The fuel/air mixture is compressed upon downward stroke of the piston 18 and is then forced in the range of bottom dead center of the piston 18 through the transfer passages 29 into the combustion chamber 28. In the range of top dead center of the piston 18 the spark plug 23 ignites the fuel/air mixture in the combustion chamber 28. The subsequent combustion accelerates the piston 18 in the direction toward bottom dead center. As soon as outlet 36 opens, the exhaust gases will flow out of the combustion chamber 28 and fresh fuel/air mixture for the next engine cycle flows through the transfer passages 29 from the crankcase 17 into the combustion chamber.

In order to reach for each engine speed a beneficial behavior of the internal combustion engine 15, the ignition timing, i.e., the point in time at which the spark plug 23 ignites relative to top dead center of the piston 18, is set as a function of the engine speed of the internal combustion engine 15. A diagram for the ignition timing ZZP across the engine speed n is shown in FIG. 4. In an engine speed range 30 which extends from standstill up to an engine speed $n_1$, the ignition timing ZZP for increasing engine speed is adjusted more and more to "advanced". The engine speed range 30 corresponds to the starting engine speed range of the internal combustion engine 15. As indicated in an exemplary fashion by the dashed line 38 in FIG. 4, for the engine speed range 30, i.e. for the starting operation, several characteristic curves are advantageously saved or stored in the ignition control device; these characteristic curves specify the ignition timing ZZP as a function of the engine speed n and are selected as a function of one or several operating parameters of the internal combustion engine 15, as is known in the art.

The engine speed range 31 adjoins the engine speed range 30 and corresponds to the idle range. The engine speed range 31 extends from the engine speed $n_1$ up to the coupling engine speed $n_K$. The coupling engine speed $n_K$ is advantageously within an engine speed range of approximately 3,500 RPM up to approximately 5,000 RPM. The coupling engine speed $n_K$ is the engine speed n at which the clutch 25 engages. When the clutch 25 engages within an engine speed band, the coupling engine speed $n_K$ is the average engine speed between the engine speed n at which the clutch 25 begins to engage and the engine speed n at which the clutch 25 is completely engaged. The engine speed $n_1$ is located advantageously in a range of approximately 1,000 RPM up to approximately 3,000 RPM. In the engine speed range 31 which corresponds to idle, the ignition timing ZZP is adjusted to a third ignition timing $ZZP_3$ that is comparatively late (retarded). The third ignition timing $ZZP_3$ at idle can be advantageously approximately from 8° crank angle before top dead center of the piston 18 up to approximately 14° crank angle before top dead center of the piston 18. The crank angle defines in this context the relative position of the crankshaft 20 relative to top dead center of the piston 18. A crank angle of 360° correspond to a complete revolution of the crankshaft 20.

Above the coupling engine speed $n_K$ there is an engine speed range 32 that corresponds to the partial load range. The engine speed range 32 extends from the coupling engine speed $n_K$ to a limit engine speed $n_G$. The limit engine speed $n_G$ is at least 7,000 RPM. The limit engine speed $n_G$ is at least twice the coupling engine speed $n_K$. Advantageously, the limit engine speed $n_G$ is between approximately 7,000 RPM and approximately 9,000 RPM. In the engine speed range 32 that corresponds to the partial load range, the ignition timing ZZP is adjusted by the ignition control device 22 to a first ignition timing $ZZP_1$ that is advanced relative to the third ignition timing $ZZP_3$. The first ignition timing $ZZP_1$ is in the range of approximately 10° crank angle before top dead center of the piston 18 up to approximately 40° crank angle before top dead center of the piston 18. In particular, the first ignition timing $ZZP_1$ is in the range of approximately 10° crank angle before top dead center of the piston 18 up to approximately 35° crank angle before top dead center of the piston 18.

Across the entire first engine speed range 32, the correlated first ignition timing $ZZP_1$ can be constant; in FIG. 4 the solid line in the engine speed range 32 illustrates a constant course of the ignition timing ZZP. For each engine speed n of the first engine speed range 32 accordingly the same ignition timing $ZZP_1$ is adjusted. However, it can also be provided that the ignition timing $ZZP_1$ changes as a function of the engine speed wherein the change of the ignition timing ZZP advantageously is minimal in an engine speed range 31, 32, 33. The dashed line 47 indicates in an exemplary fashion a linear descending course of the curve that represents the relation between ignition timing ZZP and engine speed n. All ignition timings ZZP of the first engine speed range 32 are in this context within an engine speed range 49 that advantageously encompasses a range of at most approximately 8° crank angle. A combination of a course of the curve that is constant with increasing engine speed and of a course of the curve that descends with increasing engine speed can be advantageous. A descending course of the curve corresponds to an adjustment of the ignition timing ZZP with increasing engine speed n to "retarded". Advantageously, the ignition timing ZZP in the first engine speed range 32 is not adjusted to "advanced" with increasing engine speed n. The curve that indicates the course of the ignition timing ZZP across the engine speed n in the first engine speed range 32 is advantageously continuous and therefore has no jump in the ignition timing.

Above the limit engine speed $n_G$ the engine speed range 32 is adjoined by an engine speed range 33 which corresponds to the full load range. In the engine speed range 33 the ignition timing ZZP is adjusted to a second ignition timing $ZZP_2$ that is significantly advanced relative to the first ignition timing $ZZP_1$. With solid line a constant course of the second ignition timing $ZZP_2$ across the engine speed n is illustrated. The second ignition timing $ZZP_2$ can however also change as a function of the engine speed n wherein this change is in particular minimal. The dashed line 48 shows in an exemplary fashion the course of the second ignition timing $ZZP_2$ that drops with engine speed wherein the drop is linear. In this context, with increasing engine speed n a retarded second ignition timing $ZZP_2$ is adjusted. In this way, the engine speed n is stabilized within the second engine speed range 33. The second ignition timings $ZZP_2$ in this context are within a second engine speed range 33 that encompasses advantageously at most approximately 8° crank angle. Each second ignition timing $ZZP_2$ is positioned at least 5° crank angle, in particular at least 10° crank angle, advanced of each first ignition timing $ZZP_1$. In particular, the second ignition timing $ZZP_2$ at the limit engine speed $n_G$ is at least 10° crank angle before the first ignition timing $ZZP_1$ at the limit engine speed $n_G$. The limit value of the curves, which indicate the course of the ignition timing ZZP across the engine speed n in the first engine speed range 32 and in the second engine speed range 33, differs at the limit engine speed $n_G$ therefore by at least 5° crank angle. In this context, the limit value is retarded for the first engine speed range 32 by at least 5° crank angle in comparison to the limit value for the second engine speed range 33. The curve that indicates the course of the ignition timing ZZP across the engine speed n has at the limit engine speed $n_G$ a jump of at least 5° crank angle.

Each second ignition timing $ZZP_2$ is advantageously in the range of approximately 20° crank angle before top dead center of the piston 18 up to approximately 45° crank angle before top dead center of the piston 18. The second ignition timing $ZZP_2$ is in particular in the range of approximately 30° crank angle before top dead center of the piston 18 up to 40° crank angle before top dead center of the piston 18.

The engine speed range 33 extends from the limit engine speed $n_G$ up to the second engine speed $n_2$. The second engine speed $n_2$ is greater than the limit engine speed $n_G$ and is advantageously in the range of approximately 8,500 RPM up to maximum engine speed of the internal combustion engine. The engine speed range 33 is adjoined above the second engine speed $n_2$ by an engine speed range 34 which corresponds to the cut-off or speed regulation range of the internal combustion engine 15. In the engine speed range 34, the ignition timing ZZP is adjusted to a fourth ignition timing $ZZP_4$ that is significantly retarded in relation to the second ignition timing $ZZP_2$. In the embodiment, the fourth ignition timing $ZZP_4$ is also retarded relative to the first ignition timing $ZZP_1$. The fourth ignition timing $ZZP_4$ however can also be in the range of the first ignition timing $ZZP_1$. Due to the adjustment of the ignition timing ZZP to "retarded" in the engine speed range 34, the internal combustion engine 15 is speed-regulated and the engine speed n drops. For the engine speed range 34 also another ignition timing, for example, the second ignition timing $ZZP_2$ can be provided.

The engine speed range 32 that corresponds to partial load is designed as a very wide range. In the engine speed range between the coupling engine speed $n_K$ and the limit engine speed $n_G$ the ignition timing is constant when the engine is operated at an engine speed that is within the engine speed range 32. In this way, a stable operation of the internal combustion engine 15 at partial load is possible. Since the ignition timing $ZZP_1$ up to the limit engine speed $n_G$ is adjusted constantly to a comparatively late (retarded) ignition timing $ZZP_1$, even at very high partial load a uniform operation of the internal combustion engine 15 with minimal engine speed fluctuations is possible.

It has been found that vibrations may occur upon transition from the engine speed range 32 to the engine speed range 33 as a result of the sudden adjustment of the ignition timing ZZP from the first ignition timing $ZZP_1$ to the second ignition timing $ZZP_2$ at the limit engine speed $n_G$. In particular for power tools with a guide tube 3 as in case of the trimmer illustrated in FIG. 1, these vibration may cause vibrations of the entire guide tube 3. This is undesirable. In order to reduce the vibrations or to avoid them, it is provided that, after surpassing the limit engine speed $n_G$ upon acceleration, i.e., when the engine speed n changes from the engine speed range 32 for partial load to the engine speed range 33 for full load, the ignition timing 77P, as indicated in FIG. 5 by the dashed lines 39, is not adjusted suddenly with a jump from the first ignition timing $ZZP_1$ to the second ignition timing $ZZP_2$ but, instead, a time-dependent, in particular step-wise, adjustment of the ignition timing ZZP from the first ignition timing $ZZP_1$ to the second ignition timing $ZZP_2$ along arrow 40 is carried out The time-dependent adjustment of the ignition timing ZZP is advantageously done until the second ignition timing $ZZP_2$ is reached or the engine speed leaves the engine speed range 33 of full load.

The stepwise adjustment of the ignition timing ZZP can be started immediately after surpassing the limit engine speed $n_G$. Advantageously, the adjustment of the ignition timing from the first ignition timing $ZZP_1$ to the second ignition timing $ZZP_2$ is however done with delay. For this purpose, it can be provided that the ignition timing adjustment will begin only once an activation engine speed $n_A$ that is above the limit engine speed $n_G$ has been surpassed. This is schematically indicated in FIG. 5. Alternatively or in addition, the adjustment of the ignition timing 77P from the first ignition timing $ZZP_1$ to the second ignition timing $ZZP_2$ can be started when a certain time period has elapsed, in particular a predetermined number of engine cycles has been completed, after surpassing the limit engine speed $n_G$. The time-dependent adjustment of the ignition timing ZZP avoids that the engine speed will surpass or drop below the limit engine speed $n_G$ repeatedly and in immediate sequence and avoids the vibrations caused thereby. Since upon surpassing the limit engine speed $n_G$ a time-dependent adjustment of the ignition timing ZZP is realized, no linearly ascending area of the ignition timing curve between partial load and full load is required for avoiding an ignition timing jump between partial load and full load. In this way, a wide engine speed range 33 for full load with advanced ignition timing ZZP and a wide engine speed range 32 for partial load with retarded ignition timing ZZP is enabled.

Figure 6:
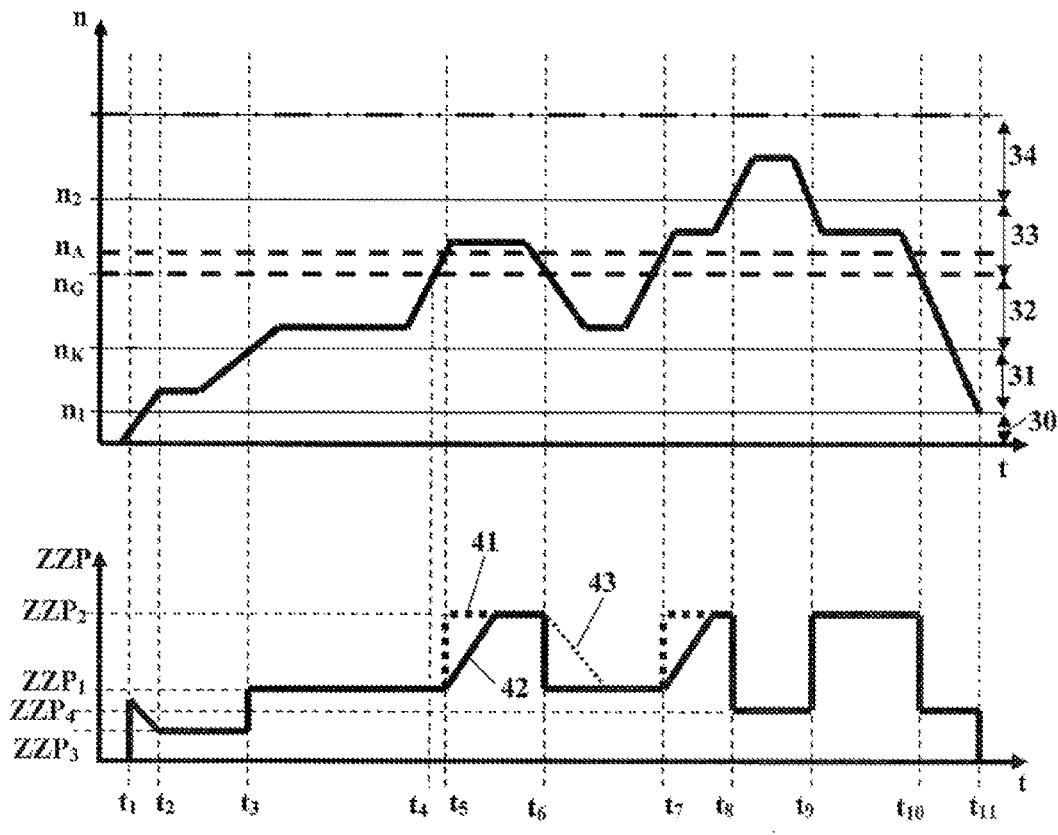
FIG. 6 shows in two graphs the course of the engine speed and of the ignition timing as a function of time, respectively.

FIG. 6 shows schematically the course of the engine speed n and of the ignition timing ZZP across the time t. The engine speed ranges 30, 31, 32, 33, and 34 are indicated in FIG. 6 on the right side of the diagram for better clarity. At a first point in time $t_1$ the internal combustion engine 15 is started. The engine speed increases to a second point in time $t_2$. The engine speed is within the engine speed range 30 for the starting operation. With increasing engine speed n, the ignition timing ZZP is advantageously controlled based on several operating parameters. At the point in time $t_3$ the engine speed n is between the first engine speed $n_1$ and the coupling engine speed $n_K$ in the engine speed range 31. The ignition timing ZZP is constant within the engine speed range 31 and is adjusted to the third ignition timing $ZZP_3$. At the point in time $t_3$ the engine speed n surpasses the coupling engine speed $n_K$. The ignition timing is then adjusted at the point in time $t_3$ to the first ignition timing $ZZP_1$ for the engine speed range 32. At the point in time $t_4$ the limit engine speed $n_G$ is surpassed. The ignition timing ZZP remains first at the first ignition timing $ZZP_1$ until upon further acceleration at the point in time $t_5$ also the activation engine speed $n_A$ is surpassed. Only once the point in time $t_5$ has been reached, the ignition timing ZZP is adjusted from the first ignition timing $ZZP_1$ to the second ignition timing $ZZP_2$. Alternatively, the ignition timing ZZP can be adjusted after lapse of a predetermined time that is for example the time span between the points in time $t_4$ and $t_5$. This adjustment is however not done in a sudden fashion, as indicated by the dashed line 41, but stepwise and, in the illustrated embodiment, in the form of a linearly extending ramp until the second ignition timing $ZZP_2$ is reached. Instead of the ramp that is illustrated by line 42, any other course of the ignition timing ZZP can be provided for the adjustment of the ignition timing ZZP from the first ignition timing $ZZP_1$ to the second ignition timing $ZZP_2$.

At the point in time $t_5$ the engine speed n drops below the limit engine speed $n_G$ and the ignition timing is then adjusted suddenly from the second ignition timing $ZZP_2$ to the first ignition timing $ZZP_1$ as indicated in FIG. 6 with a solid line. At the point in time $t_7$ the activation engine speed $n_A$ is again surpassed and the ignition timing ZZP is then adjusted stepwise from the first ignition timing $ZZP_1$ to the second ignition timing $ZZP_2$. At the point in time $t_8$ the second engine speed $n_2$ is surpassed and the engine speed is regulated. For this purpose, the ignition timing ZZP is adjusted to a fourth ignition timing $ZZP_4$ that is comparatively late (retarded). In the illustrated embodiment, the fourth ignition timing $ZZP_4$ is between the first ignition timing $ZZP_1$ and the third ignition timing $ZZP_3$. The regulation can be realized also in a different way. At the point in time $t_9$ the engine speed drops again below the engine speed $n_2$ and the ignition timing ZZP is adjusted suddenly to the second ignition timing $ZZP_2$ for full load range. At the point in time $t_{10}$ the engine speed also drops below the limit engine speed $n_G$ and the ignition timing ZZP is suddenly adjusted from the second ignition timing $ZZP_2$ to the first ignition timing $ZZP_1$. At the point in time $t_{11}$ the internal combustion engine 15 is switched off, in particular by short-circuiting the ignition, so that no further ignition activity is possible.

Figure 7:
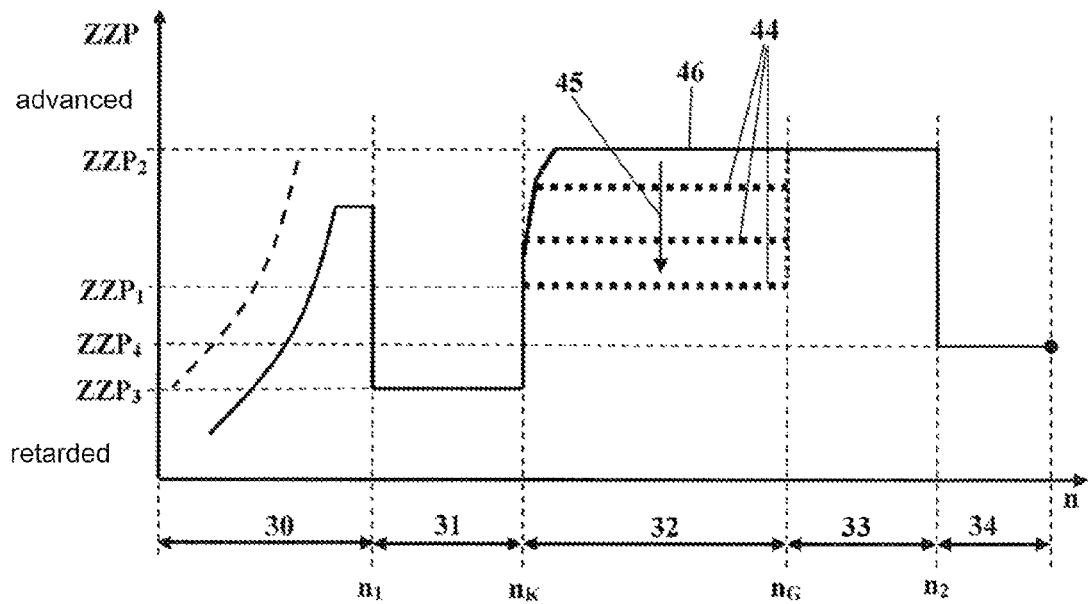
FIG. 7 is an illustration of the ignition timing plotted against the engine speed.

It has been found that in particular in case of a cold internal combustion engine, i.e., when the operating temperature of the internal combustion engine 15 is below a predetermined operating temperature, the retarded first ignition timing $ZZP_1$ leads to bad acceleration in the first engine speed range 32. In order to avoid this, upon fulfilling at least one first criterion, in particular upon operation below a predetermined operating temperature of the internal combustion 15, it is provided to adjust the ignition timing ZZP in the engine speed range 32 stepwise from the second ignition timing $ZZP_2$ to the first ignition timing $ZZP_1$ as indicated by line 44 and arrow 45 in FIG. 7. In this context it is provided that upon engine speed change into the engine speed range 32, i.e., when the engine speed increases from the engine speed range 31 past the coupling engine speed $n_K$ or drops from the engine speed range 33 below the limit engine speed $n_G$, the ignition timing ZZP first is adjusted to the second ignition timing $ZZP_2$ and the ignition timing ZZP is then adjusted stepwise to "retarded" to the ignition timing $ZZP_1$ as soon as the first criterion has been fulfilled. The course of the ignition timing ZZP in the engine speed range 32 shown in solid line 46 in FIG. 7 corresponds to a known characteristic line for the ignition timing ZZP with which a stable operation of the internal combustion 15 at an approximately constant engine speed in the engine speed range 32 is not possible because very large engine speed fluctuations are observed. The engine speed fluctuations result from the great acceleration as a result of the energy-rich combustion at advanced ignition timing and the subsequently occurring engine cycle or cycles without combustion in which the ignition is skipped or suspended for controlling the engine speed.

When the operating temperature is below a predetermined temperature, it has been found that at the first ignition timing $ZZP_1$ in the engine speed range 32 a combustion duration that is too low and therefore an acceleration that is too low will result. When the operating temperature is above the predetermined operating temperature, i.e., the internal combustion engine 15 is hot, a power output that is too great is achieved in the engine speed range 32, i.e., at partial load, in operation of the internal combustion engine 15 based on the line 46 in the engine speed range 32 so that very large engine speed fluctuations occur. The adjustment of the ignition timing from the second ignition timing $ZZP_2$ to the first ignition timing $ZZP_1$ in several steps is therefore advantageously provided only when a predetermined first criterion is present. The first criterion is advantageously that a predetermined operating temperature of the internal combustion engine 15 is reached.

In order to estimate whether the internal combustion engine 15 has reached a predetermined operating temperature, a temperature and/or the lapse of a predetermined time span can be utilized. For determining the lapse of a predetermined time span, advantageously the number of engine cycles that are completed after a predetermined event are determined. Advantageously, before starting the internal combustion engine 15, the temperature of the internal combustion engine 15 or another temperature of the power tool 1 is measured. The temperature is in particular the temperature of a control unit such as the ignition control device 22 of the power tool 1. Based on the temperature upon starting, it can be determined how many engine cycles are required for reaching the predetermined operating temperature. In this context, the engine cycles from starting or the engine cycles above a predetermined engine speed or upon surpassing a predetermined engine speed, for example, the limit engine speed $n_G$, can be utilized. A more precise measurement of the operating temperature of the internal combustion engine 15 may be advantageous. For adjusting the ignition timing, an estimation of the operating temperature will be usually sufficiently precise, however. An estimation of the operating temperature can be done in a simple way, for example, based on a starting temperature and/or a number of engine cycles.

The adjustment of the ignition timing 77P from the second ignition timing $ZZP_2$ to the first ignition timing $ZZP_2$ in the engine speed range 32 can be carried out with time delay, i.e., after the engine speed has already been within the engine cycle range 32 for a predetermined number of engine cycles. The course of the ignition timing ZZP for a stepwise adjustment of the ignition timing from the second ignition timing $ZZP_2$ to the first ignition timing $ZZP_1$ is schematically indicated by a line 43 in FIG. 6 beginning at the point in time $t_6$. The adjustment of the ignition timing ZZP from the second ignition timing $ZZP_2$ to the first ignition timing $ZZP_1$ in the engine speed range 32 is advantageously carried out once, i.e., when the first predetermined criterion is fulfilled. When the engine speed n at this point in time is not within the first engine speed range 32, it can be provided to adjust the ignition timing ZZP in the first engine speed range 32 before fulfilling the first predetermined criterion to the first ignition timing $ZZP_1$. When the engine speed n after fulfilling the first predetermined criterion then again passes into the first engine speed range 32, it can be provided that the ignition timing ZZP is adjusted immediately to the first ignition timing $ZZP_1$.

The specification incorporates by reference the entire disclosure of German priority document 10 2012 024 840.7 having a filing date of Dec. 19, 2012.

While specific embodiments of the invention have been shown and described in detail to illustrate the inventive principles, it will be understood that the invention may be embodied otherwise without departing from such principles.

What is claimed is:

1. A method for operating an internal combustion engine of a hand-guided power tool, wherein the power tool has a clutch and at least one tool member, wherein the clutch engages at a coupling engine speed and wherein the internal combustion engine at engine speeds above the coupling engine speed is operatively connected by the clutch to the tool member, wherein the internal combustion engine has a cylinder and a piston supported reciprocatingly in the cylinder, wherein the piston drives in rotation a crankshaft which is rotatably supported in a crankcase of the internal combustion engine, wherein the internal combustion engine has an ignition control device that for each engine speed of the internal combustion engine specifies at least one ignition timing; the method comprising:
specifying for each engine speed of a first engine speed range a correlated first ignition timing, wherein each first ignition timing is an ignition timing of a first ignition timing range;
specifying for each engine speed of a second engine speed range a correlated second ignition timing, wherein each second ignition timing is an ignition timing of a second ignition timing range, wherein the first ignition timing range and the second ignition timing range are selected such that each first ignition timing is retarded by at least 5° crank angle relative to each second ignition timing;
selecting the first engine speed range to extend at least from the coupling engine speed range to the limit engine speed, wherein the limit engine speed is at least approximately 7,000 RPM, wherein the second engine speed range adjoins the first engine speed range and the second engine speed range is completely above the first engine speed range.

2. The method according to claim 1, selecting the limit engine speed to be at least twice the coupling engine speed.

3. The method according to claim 1, wherein the limit engine speed is approximately 7,000 RPM up to approximately 9,000 RPM.

4. The method according to claim 1, wherein the first ignition timing and the second ignition timing differ by at least 10° crank angle.

5. The method according to claim 1, wherein the first and second ignition timing ranges each encompass at most 8° crank angle.

6. The method according to claim 1, further comprising not advancing the first ignition timing in the first engine speed range with increasing engine speed.

7. The method according to claim 1, wherein a curve that indicates a relation between the ignition timing and the engine speed within the first engine speed range is continuous.

8. The method according to claim 1, wherein the first ignition timing is within a range of approximately 10° crank angle before top dead center of the piston up to approximately 40° crank angle before top dead center of the piston.

9. The method according to claim 1, wherein the second ignition timing is within a range of approximately 20° crank angle before top dead center of the piston to approximately 45° crank angle before top dead center of the piston.

10. A method for operating an internal combustion engine of a hand-guided power tool, wherein the power tool has a clutch and at least one tool member, wherein the clutch engages at a coupling engine speed and wherein the internal combustion engine at engine speeds above the coupling engine speed is operatively connected by the clutch to the tool member, wherein the internal combustion engine has a cylinder and a piston supported reciprocatingly in the cylinder, wherein the piston drives in rotation a crankshaft which is rotatably supported in a crankcase of the internal combustion engine, wherein the internal combustion engine has an ignition control device that for each engine speed of the internal combustion engine specifies at least one ignition timing; the method comprising:
specifying for each engine speed of a first engine speed range a correlated first ignition timing, wherein each first ignition timing is an ignition timing of a first ignition timing range;
specifying for each engine speed of a second engine speed range, adjoining the first engine speed range, a correlated second ignition timing, wherein each second ignition timing is an ignition timing of a second ignition timing range;
retarding each first ignition timing by at least 5° crank angle relative to each second ignition timing;
selecting the first engine speed range to extend at least from the coupling engine speed range to the limit engine speed, wherein the limit engine speed is at least approximately 7,000 RPM;
wherein, in at least one operating state, for an engine speed change from an engine speed outside of the first engine speed range or the second engine speed range to an engine speed within the first engine speed range or the second engine speed range, the ignition timing is not adjusted suddenly to the first ignition timing or the second ignition timing but subjected to a time-dependent control until the first ignition timing or the second ignition timing is reached, respectively, or the engine speed leaves the first engine speed range or the second engine speed range again.

11. The method according to claim 10, wherein the time-dependent control of the ignition timing is done as a function of a number of engine cycles.

12. The method according to claim 10, wherein the ignition timing, after surpassing the limit engine speed and after subsequent completion of a predetermined number of engine cycles in the first engine speed range or the second engine speed range is changed stepwise to the first ignition timing or the second ignition timing, respectively.

13. The method according to claim 10, wherein the ignition timing for an engine speed change from an engine speed of the first engine speed range to an engine speed of the second engine speed range in at least one operating state, the first ignition timing being the starting point, is advanced by the time-dependent control until the second ignition timing is reached or the engine speed leaves the second engine speed range.

14. The method according to claim 13, wherein the time-dependent control of the ignition timing upon an engine speed change from an engine speed of the first engine speed range to an engine speed of the second engine speed range is carried out in any operating state.

15. The method according to claim 10, wherein the ignition timing for an engine speed change from an engine speed outside of the first engine speed range to an engine speed of the first engine speed range upon fulfillment of at least one first predetermined criterion, the second ignition timing being the starting point, is retarded by the time-dependent control until the first ignition timing is reached or the engine speed leaves the first engine speed range.

16. The method according to claim 15, wherein the first predetermined criterion is reaching a temperature of the power tool and/or completing a predetermined number of engine cycles after a predetermined event.

17. The method according to claim 16, wherein the predetermined event is starting the internal combustion engine.

18. The method according to claim 16, wherein the predetermined event is reaching a predetermined engine speed for the first time.

19. The method according to claim 15, wherein, upon fulfilling at least a second predetermined criterion, the ignition timing upon an engine speed change from an engine speed outside of the first engine speed range to an engine speed within the first engine speed range is adjusted suddenly to the first ignition timing.

* * * * *